UNITED STATES PATENT OFFICE 2,607,774

BENZOPHENOTHIAZINE DYES AND METHODS OF PREPARING THE SAME

Richard C. Clapp, Old Greenwich, Conn., assignor to American Cyanamid Company, New York, N. Y., a corporation of Maine No Drawing. Application April 2, 1951, Serial No. 218,886

6 Claims. (Cl. 260—243)

This invention relates to new dyestuffs of the benzophenothiazine series, their addition salts with acids and methods of preparing the same. When in the form of their free bases the new compounds of this invention may be represented by the following structural formula:

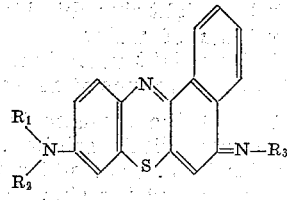

in which $R_1$ and $R_2$ are lower alkyl radicals, for instance methyl, ethyl and butyl, and $R_3$ is an aryl group. The new phenothiazines may be isolated in the form of their free bases or they may also be isolated in the form of their addition salts with acids, for instance as the hydrochloride or citrate. While several formulations for the acid salts have been proposed, it is believed that the following best corresponds with the known characteristics of the compounds:

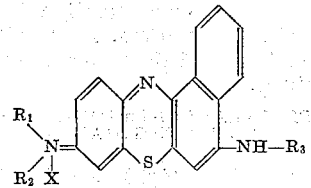

in which $R_1$, $R_2$ and $R_3$ are as defined above and X is an anion. In the form of their acid addition salts the new compounds give blue solutions and in the form of their free bases they give solutions of various shades of red.

The new dyestuffs of this invention are useful in various coloring processes and particularly in differential tissue staining. Dyes which preferentially stain one particular type of tissue are of great value in surgery and pathology. For instance, in removing tumors from animals it is much easier for the operator to determine the extent of tumorous growth and the possible existence of metastasis if a dye has been previously administered to the subject which dyes the tumor tissues to a greater extent than the normal body tissue. Likewise, in making microscopic slides, dyes which preferentially stain one particular type of tissue are of value.

Some of the new compounds also have therapeutic activity. For instance the compound of the above formula in which $R_1$ and $R_2$ represent propyl groups and $R_3$ represents para-tolyl has shown considerable activity against tubercle bacilli infections in mice. By employing this compound in the feed given mice infected with an otherwise deadly tubercle bacilli infection, the life of the mice can be greatly prolonged.

As stated above, $R_3$ represents an aryl group. The aryl group is preferably one having one or two homocyclic rings, for instance phenyl or naphthyl. In many instances the substitution of the aryl radical gives compounds having more desirable properties and it is intended that compounds having the aryl groups substituted by such substituents as lower alkyl, for instance methyl; and lower alkoxy, for instance ethoxy, be within the scope of this invention. Compounds having the aryl group substituted by a negative group, for instance chloro, are also of value.

While it is not intended that this invention be limited to the new dyestuffs produced in any particular manner, a convenient method of preparing the new compounds has been discovered and it is intended that this new method also constitute a part of the invention. The new method comprises reacting a 2-amino-5-dialkylamino-benzenethiosulfuric acid with a N-aryl-1-naphthylamine as illustrated by the following equation:

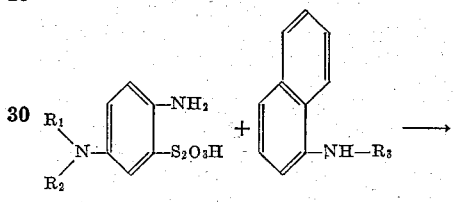

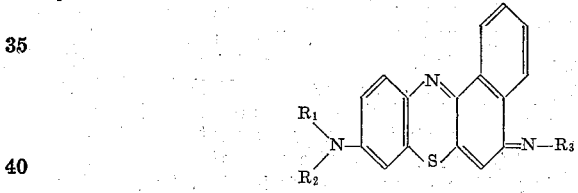

in which $R_1$, $R_2$ and $R_3$ are as defined above.

The reaction is preferably performed in an inert solvent. Suitable inert solvents may be illustrated by the following: water; lower fatty acids, for instance acetic acid; lower alcohols, for instance ethyl alcohol; and cyclic ethers, for instance dioxane. A preferred procedure involves forming a solution of the two reactants and adding thereto or forming therein a suitable strong oxidizing agent, for instance chromic acid. The reaction proceeds slowly at room temperature, for instance 20–30° C. and may be performed at such temperatures if desired; however, the reaction velocity is increased by higher temperatures and temperatures from 60–110° C. are preferred. If desired, the reaction may be carried out at even higher temperatures, for instance 130° C.

This invention will be more fully illustrated by the following specific examples in which all parts are by weight unless otherwise indicated:

EXAMPLE I

9 - diethylamino - 5 - phenyliminobenzo[a]phenothiazine

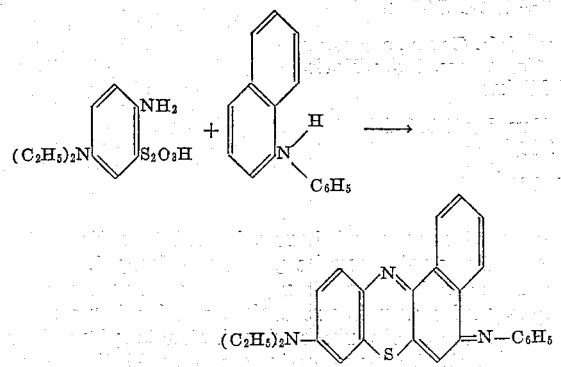

Reagents:
- 2 parts by weight 2-amino-5-diethylaminobenzenethiosulfuric acid (Bernthsen, Ann., 251, 54 (1889))
- 1.6 parts by weight N-phenyl-1-naphthylamine
- 0.6 parts by volume concentrated hydrochloric acid
- 50 parts by volume glacial acetic acid
- 27 parts by volume 10% potassium dichromate in water The first four reagents were mixed, and the dichromate solution was added dropwise at room temperature in twelve minutes. The mixture darkened rapidly and became blue-green. After stirring for twenty minutes at room temperature, it was stirred for two hours on the steam bath. The mixture was then cooled and poured into water. A precipitate could be formed from this solution by the addition of hydrochloric acid and salt, but the greater part was worked up as described below.

The diluted acetic acid solution was made basic with ammonia, and the flocculent precipitate was filtered, washed with water, and dried at 60° C. The dried product was dried to a powder and extracted with two 100 parts by volume portions of boiling benzene. The insoluble material was discarded. The dark red benzene solution was shaken thoroughly with 10% hydrochloric acid. The liquid phases were drawn off carefully from the dark blue gummy material that adhered to the walls of the separatory funnel, and this residue was washed twice in situ with benzene and twice with 10% hydrochloric acid. The gummy solid in the funnel was dissolved in alcohol and the solution concentrated in vacuo. The residue was treated with ammonium hydroxide to give a solid product, greenish in hue but becoming red-brown on powdering. The product crystallized from benzene-hexane as dark green, glistening crystals that melted from 235° C. to 241° C. It appeared to be chromatographically pure.

EXAMPLE II

9 - dipropylamino - 5 - p - tolyliminobeno [a] phenothiazine

A.

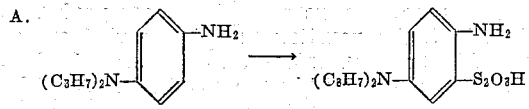

B.

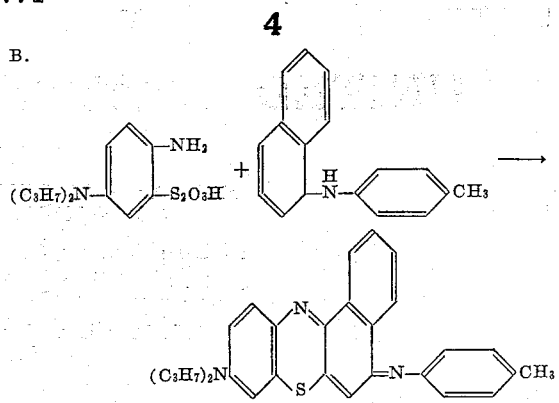

A. 2-AMINO-5-DIPROPYLAMINOBENZENETHIOSULFURIC ACID

Reagents:
- 33.5 parts by weight p-aminodipropylaniline
- 122 parts by weight aluminum sulfate (18H2O) in 440 parts by volume of water
- 62.5 parts by weight sodium thiosulfate in 330 parts by volume of water
- 23.8 parts by weight zinc chloride in 75 parts by volume of water
- 14.5 parts by weight potassium dichromate in 180 parts by volume of water To a mixture of the p-aminodipropylaniline and the aluminum sulfate solution, vigorously stirred in an ice bath, were added the sodium thiosulfate solution and the zinc chloride solution. The potassium dichromate solution was then added dropwise over a period of two hours. After stirring in the ice bath for an additional hour, the solid was filtered and washed twice with ice water. A 50-50 alcohol-ether solution was also used to wash the solid material from the flask. A light purple product that melted and decomposed from 193° C. was obtained. Five grams of this product was dissolved in 500 parts by volume of 95% alcohol. After treatment with a little Darco and concentration to about 200 parts by volume, colorless, finely-divided crystals that melted and decomposed from 208° C. were obtained.

B. 9-DIPROPYLAMINO-5-p-TOLYLIMINOBENZO [a] PHENOTHIAZINE

Reagents:
- 14.9 parts by weight 2-amino-5-dipropylaminobenzenethiosulfuric acid
- 11.4 parts by weight N-p-tolyl-1-naphthylamine 4.1 parts by volume concentrated hydrochloric acid.
- 375 parts by volume glacial acetic acid
- 184 parts by volume 10% potassium dichromate in water.

The dichromate solution was added dropwise over thirty minutes to the stirred and cooled mixture of the other reactants, which rapidly became dark blue-green. Stirring was continued for one hour at room temperature and then for four hours on the steam bath. After the reaction mixture had stood at room temperature for sixteen hours, it was poured into a solution of 600 parts by volume of concentrated ammonium hydroxide and 750 parts by volume of water with cooling and stirring. The precipitate was filtered, washed with water, and then extracted three times with 300 parts by volume portions of boiling benzene and twice with 150 parts by volume portions. To the cold benzene solution was added 750 parts by volume of 10% hydrochloric acid, and the mixture was thoroughly shaken in a flask. The dark blue, partially solid precipitate was filtered, washed with a little 10% hydrochloric acid and benzene, and dissolved in 1 liter of alcohol. This alcoholic solution was treated dropwise with ammonium hydroxide while stirring and cooling in ice, and water was subsequently added to ensure complete precipitation of the free base. After thorough cooling, 15.1 parts by weight of a dark, purple-red solid that melted from 145 to 160° C. was obtained. Crystallization of 9.7 parts by weight of this material from 970 parts by volume of heptane (Darco) gave dark brown, finely-divided crystals (needles); melting point 174–176° C. However, crystallization of the remaining 5.4 parts by weight from 540 parts by volume of heptane (Darco) gave 3.26 parts by weight of green crystals with a metallic lustre; melting point 197–199° C. Crystallization in the latter case probably took place more slowly. These two spectrally similar products appear to represent two crystalline forms of the compound, and the lower melting form could be converted to the higher melting form by crystallization from heptane and seeding with the latter. The compound appeared to be chromatographically pure.

EXAMPLE III

*9-dimethylamino-5-phenyliminobenzo[a]-phenothiazine*

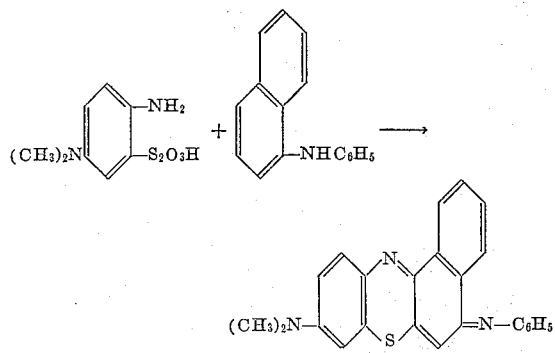

Reagents:
- 12.06 parts by weight 2-amino-5-dimethyl-aminobenzenethiosulfuric acid (Bernthsen, Ann., 251, 50 (1889))
- 10.65 parts by weight N-phenyl-1-naphthylamine
- 1.51 parts by volume concentrated hydrochloric acid
- 20.8 parts by weight potassium dichromate in 187 parts by volume of water Two-thirds of the dichromate solution was added dropwise to a stirred and cooled mixture of the other reactants. The ice bath was then removed, and the remainder of the dichromate solution was added dropwise at room temperature. The mixture was stirred on the steam bath for four hours. The precipitate from the reaction mixture was filtered, and it was then stirred with 120 parts by volume of concentrated ammonium hydroxide and 480 parts by volume of water for forty minutes. The resulting precipitate of the free base was extracted three times with 200 parts by volume of boiling benzene. The benzene solution was concentrated to a smaller volume and was shaken with an equal volume of 10% hydrochloric acid. The blue precipitate that separated was dissolved in 500 parts by volume of alcohol, and the alcoholic solution was made alkaline with ammonia and diluted with water. Crystallization of the resulting precipitate from benzene and petroleum ether gave a brown product melting from 244 to 249° C.

I claim:
1. The new compounds represented by the formula:

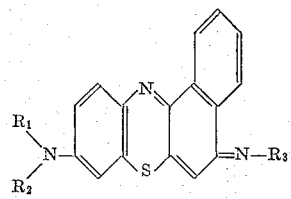

in which $R_1$ and $R_2$ represent lower alkyl radicals and $R_3$ represents an aromatic nucleus having one to two 6-membered homocyclic rings, and acid addition salts thereof.

2. Compounds represented by the formula

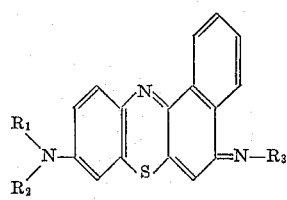

in which $R_1$ and $R_2$ represent lower alkyl groups and $R_3$ represents tolyl.

3. 9-dipropylamino - 5 - p-tolyliminobenzo[a]-phenothiazine.

4. Compounds represented by the formula:

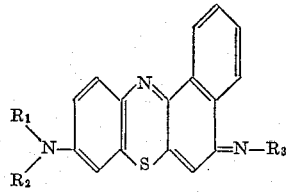

in which $R_1$ and $R_2$ represent lower alkyl radicals and $R_3$ represents a phenyl radical.

5. 9 - diethylimino - 5 - phenyliminobenzo[a]-phenothiazine.

6. The method of producing the new compounds represented by the formula:

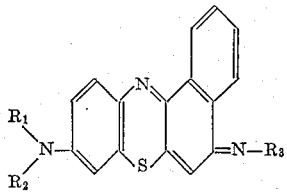

in which $R_1$ and $R_2$ represent lower alkyl radicals and $R_3$ represents an aromatic nucleus having one to two 6-membered homocyclic rings, and acid addition salts thereof, which comprises reacting a 2-amino-5-dialkylaminobenzenethiosulfuric acid with a n-aryl-1-naphthylamine in an inert solvent in the presence of a strong oxidizing agent.

RICHARD C. CLAPP.

REFERENCES CITED

The following references are of record in the file of this patent:

FOREIGN PATENTS

| Number | Country | Date |
|---|---|---|
| 5,268 | Great Britain | 1896 |
| 96,690 | Germany | Feb. 25, 1898 |

OTHER REFERENCES

Nietzki et al.: Beilstein (Handbuch, 4th ed.), vol. 27, p. 405 (1937).